UNITED STATES PATENT OFFICE.

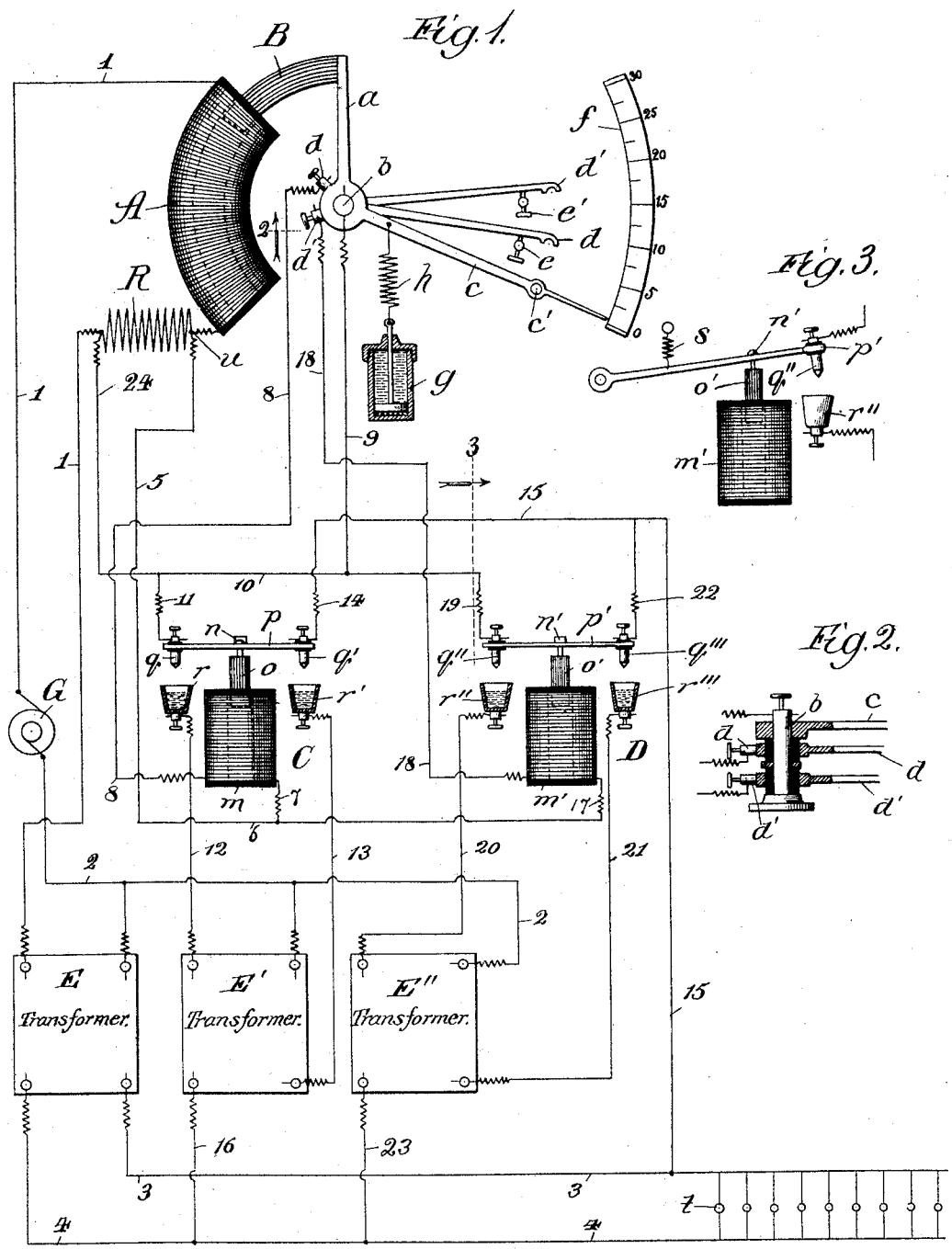

SAMUEL KIRLIN, OF WATERTOWN, SOUTH DAKOTA.

SYSTEM OF ELECTRICAL DISTRIBUTION.

SPECIFICATION forming part of Letters Patent No. 617,165, dated January 3, 1899.

Application filed August 18, 1898. Serial No. 688,860. (No model.)

*To all whom it may concern:*

Be it known that I, SAMUEL KIRLIN, a citizen of the United States, residing in Watertown, in the county of Codington and State of South Dakota, have invented certain new and useful Improvements in Systems of Electrical Distribution, of which the following is a specification.

My invention relates to a system of electrical distribution.

It is a well-known fact that an electric transformer such as those usually used for transforming an alternating electric current from a higher to a lower potential for the purpose of supplying current for electric incandescent lamps or the like in parallel circuit when at work on a load approaching its rated capacity is much more efficient than when the load of the said transformer has been reduced to a degree equal to only a small portion of its capacity. Therefore the highest efficiency of a system of distribution such as described is obtained when all of the transformers in that system are provided with and operated at a full load.

In an electric lighting or power system it frequently happens that the work to be done at a given point in the distribution will vary greatly with relation to the time of the day or night. For instance, at one or many given points in an electric-light circuit during a period extending between certain hours of the service the transformers provided at the respective locations may be loaded to their capacity, at which time the highest efficiency and best regulation are secured. If this condition should obtain throughout the entire period of the service, then my system of distribution would not be of any practical value. In practice, however, this is not found to be the actual condition which prevails in distributing electric current at many points in a given system. In fact, it is seldom, if ever, that all of the transformers are sufficiently loaded at any one time to give the best results. In practice in the distribution of electricity from an alternating circuit for electric lighting or the like a number of points in the system are selected where transformers are located. The capacity of the transformer should in every case be equal to its prospective load. It therefore follows that the transformer is seldom, if ever, loaded. An ideal system of operation would consist in substituting a number of transformers of smaller capacity having a joint capacity equal to the larger transformer at each of the said points of distribution and manually cutting into or out of circuit at various times as the load varies the number of transformers until the joint capacity equals the load at the various periods. By this means the system would be operated at its highest efficiency with regard to the operative efficiency of the transformers; but the cost of the manual attention necessary to maintain this condition would more than overbalance the increased operative efficiency of the system. If this result could be attained by the use of a mechanism that would automatically cut into circuit a number of transformers corresponding in their joint capacity to the work to be done and which would also cut out the supernumerary transformers as the load decreases, then the highest possible efficiency obtainable may be maintained, for then the transformers of the system would be always operated at or near full-load efficiency.

The object of my invention is to provide such a system of distribution.

I will now describe an apparatus and connections, it being one means by which my system of distribution may be carried into practical effect.

Referring to the accompanying drawings, Figure 1 is a diagrammatic view of my system and apparatus by the operation of which it may be carried into effect. Fig. 2 is a partial plan of the relay-switch and ampere-meter of Fig. 1. Fig. 3 is a longitudinal elevation of one side of the secondary switch of Fig. 1.

Like letters and numerals refer to like parts in the several views.

In Fig. 1, A is an ampere-meter coil. In this case it is a curved solenoid with a responsive armature consisting of a curved laminated iron core B, carried by the arm $a$, which is mounted on a central pivot-shaft $b$. A pointer $c$ is also carried by the pivot-shaft $b$, being fixed thereto. To the pointer $c$ there is attached a contact-pin $c'$, which is adapted to engage the levers $d\ d'$ to make electric contact therewith and lift them off of the adjustable rests $e\ e'$. The levers $d$ and $d'$ are loosely mounted on the shaft $b$; but they are insulated therefrom and from each other. The pointer $c$ traverses over or in front of a scale $f$, graduated for amperes. A small air or liquid dash-pot $g$ is attached to pointer $c$ to steady its movements. The spring $h$ is normally stiff, but is so adjusted that it will yield sufficiently when a sudden impulse of current, such as may be produced by a short circuit, passes over the primary circuit. The apparatus which I have just described is a relay which controls the automatic switches. The latter I will now proceed to describe.

In my system there may be one switch for each transformer, less one—that is to say, at each point of distribution in the system where there are a number of transformers grouped to be controlled for varying loads on the secondary circuit one of the transformers of the said group need not be supplied with a switch, but may be permanently connected in circuit, as shown. The switches C and D may both be mounted on the same back with the relay ampere-meter, as shown. The solenoids $m$ and $m'$, which give motion to the switch-arms $n$ and $n'$, each contain a laminated core $o$ and $o'$. The switch-arm $n$ is pivoted at one end and carries a cross-bar $p$ $p'$ at the other end, to each of which two carbon contact-points $q$ $q'$ $q''$ $q'''$ are insulatedly attached. These contact-points dip into mercury-cups $r$ $r'$ $r''$ $r'''$, respectively. A retractile spring $s$ holds the armature $n$ so that the contact-points $q$ are not in electrical connection with the mercury-cups $r$ except when current is caused to flow through the respective solenoid-coils, as hereinafter pointed out.

E E' E'' represent three transformers. Wires 3 and 4 compose a secondary circuit from the same, containing a load consisting of incandescent lamps $t$ or the like.

R is a resistance in the main primary circuit around which coils $m$ $m'$ are connected. The primary circuit from the source of supply G consists of wires 1 and 2, and it includes coil A, resistance R, and the primary coils of the transformers in parallel with each other when their circuits are closed by their respective switches C D. Wires Nos. 1, 5, 6, 7, 8, 9, 10, 11, 12, and 2 constitute the primary circuit, including the primary coil of transformer E'. Wires Nos. 13, 14, 15, 3, 4, and 16 constitute the secondary circuit, including the secondary coil of transformer E'. Wires Nos. 1, 5, 6, 17, 18, 9, 10, 19, 20, and 2 constitute the primary circuit, including the primary coil of transformer E''. Wires Nos. 21, 22, 15, 3, 4, and 23 constitute the secondary circuit, including the secondary coil of transformer E'. The current will divide in the primary circuit at point $u$. A portion will pass through resistance R and a portion will pass through the magnet solenoid-coils $m$ $m'$ over wires Nos. 5 and 24.

By the use of the apparatus described my method of distribution may be accomplished as follows: The apparatus, as shown, represents its position when there is no current flowing. When the current flows through the primary circuit, the ampere-meter relay will operate in the usual manner and indicate the number of amperes flowing. When the current in the primary circuit 1 and 2 has reached the capacity of transformer E, due to increase of load on the secondary circuit 3 and 4—say ten amperes—the contact $c'$ carried by pointer $c$ will come into electrical contact with arm $d$, which will be lifted off of stop $e$. The circuit is then complete through solenoid $o$ and a portion of the current in the primary will be diverted from flowing through resistance R and will pass from point $u$ through wires 5 6 7, thence through solenoid $m$, energizing it, attracting armature $n$ until contacts $q$ and $q'$ make connection with mercury-cups $r$ and $r'$, thence through wire 8 to arm $d$, to contact $c'$, to shaft $b$, to wires 9, 10, and 11, through the contact $q$ and mercury-cup $r$, wire 12, and then through the primary coil of transformer E'. The secondary circuit of transformer E' is completed at the same time by contact $q'$ being brought into connection with the mercury in cup $r'$. The secondary circuit for transformer E' is then through wires 13, contact $r'$ and $q'$, wires 14, 15, and 3, lamps $t$, wire 4, and secondary coil of transformer E'. When this performance has taken place, transformers E and E' are working together in parallel in circuits 1 2 and 3 4, and there will be no further change until the joint capacity of these two transformers has been reached, when the ammeter-pointer will indicate, in this case, twenty amperes, at which time contact $c'$ will make contact with arm $d'$, and transformer E'' will be thus connected in parallel with transformers E and E' in a manner similar to that just described and which will be apparent to those persons skilled in the art. It will of course be understood that a decrease in the load in the secondary circuit will cause the transformers to be cut out in the reverse order in which they were cut into circuit.

Dash-pot $g$ is designed to prevent spasmodic movements of pointer $c$, which may be due to small and sudden increments and decrements of current. Spring $h$ is designed to take care of any violent and sudden increase of current, such as may be due to current as a result of short circuits and the like.

I do not wish to be confined to the apparatus shown for carrying out my method of distribution, as it is apparent that many changes may be made therein without departing from the spirit of my invention.

What I claim, and desire to secure by Letters Patent, is—

1. A system of electric distribution, consisting of a primary circuit, a secondary circuit, two or more transformers common to both circuits, a device in the primary circuit mechanically responding to current changes therein, an electromagnetic switching device automatically controlled by the said responsive device, adapted to switch the said transformers in and out of the said primary and secondary circuits, substantially as shown and for the purpose described.

2. A system of electrical distribution consisting of a primary circuit, a secondary circuit, two or more transformers, common to both circuits, and a responsive device in the primary circuit, that will automatically control the number of transformers included in the said circuits, to correspond with the increase and decrease demands of the said secondary circuit, substantially as shown and for the purpose described.

3. A system of electrical distribution consisting of a primary circuit, a secondary circuit, two or more transformers common to both circuits, a current-indicating device in the primary circuit, provided with contacts, an electromagnetic switching device, in shunt around a resistance in the primary circuit, the connections being such that the indicating device will automatically control the operation of the switching device, substantially as shown and for the purpose described.

In testimony whereof I have signed this specification, in the presence of two subscribing witnesses, this 9th day of August, 1898.

SAMUEL KIRLIN.

Witnesses:
   JOE FORNTAIN,
   N. WARRINER.